United States Patent [19]
Whitton et al.

[11] Patent Number: 5,863,975
[45] Date of Patent: Jan. 26, 1999

[54] AQUEOUS CONSTRUCTION COMPOSITIONS WITH IMPROVED WATER RETENTION PROPERTIES AND A PROCESS FOR PROVIDING WATER RETENTION PROPERTIES TO AQUEOUS CONSTRUCTION COMPOSITIONS

[75] Inventors: Fred Whitton, Point Pleasant; Joseph Doolan, Hightstown, both of N.J.

[73] Assignee: Rheox Inc., Hightstown, N.J.

[21] Appl. No.: 796,247

[22] Filed: Feb. 6, 1997

Related U.S. Application Data

[63] Continuation of Ser. No. 538,665, Oct. 3, 1995, abandoned.
[51] Int. Cl.$^6$ ................. C08K 3/34; C08L 31/00
[52] U.S. Cl. ............ 524/445; 524/446; 524/447; 524/833
[58] Field of Search ................ 524/445, 446, 524/447, 833

[56] References Cited

U.S. PATENT DOCUMENTS

4,384,096  5/1983  Sonnabend .................. 526/313

FOREIGN PATENT DOCUMENTS

0 705 854 A1  4/1996  European Pat. Off. .

*Primary Examiner*—Peter D. Mulcahy
*Attorney, Agent, or Firm*—Michael J. Cronin

[57] ABSTRACT

Water retention additives for aqueous construction systems including joint compounds are described which are the reaction product of monomers comprising carboxylic acid monomers, nonionic vinyl monomers and specific surfactant monomers. Processes for making such polymers are described as well as the use of aqueous construction systems using the polymers. The polymers are useful in joint compounds and a broad range of similar construction systems as cellulosic replacements.

11 Claims, No Drawings

AQUEOUS CONSTRUCTION COMPOSITIONS WITH IMPROVED WATER RETENTION PROPERTIES AND A PROCESS FOR PROVIDING WATER RETENTION PROPERTIES TO AQUEOUS CONSTRUCTION COMPOSITIONS

This is a continuation of Ser. No. 08/538,665 filed Oct. 3, 1995, now abandoned.

BACKGROUND OF THE INVENTION

This invention relates to water retention additives for aqueous construction systems. Water retention additives are chemical materials which, when added in relatively small amounts to a system, improve the system's workability, lubricity, smoothness and crack resistance as the result of delayed drying and other qualities. Such additives are often referred to as water retention aids.

Aqueous construction compositions where such products have proved useful include joint compounds, pastes, construction grouts, stuccos and other water-miscible construction systems. It is generally understood, for example, that water retention control agents are one of the most essential components in joint compounds.

Commercial additives for joint compounds available today are generally cellulosic-based products. Such water retention aids are expensive and, at the same time, have often failed to provide the necessary water retention properties to achieve smooth application of the joint compound without premature drying, and proper viscosity, as is demanded by modern construction contractors. It is highly desired that such systems be flowable during prolonged application, but that they not sag or separate after they have been applied. It is further desired that, while being applied, the compound remain on the substrate and not slide. It is still further desired that such systems be stable over a range of temperatures (and for a sufficient period of time), so that their properties do not change upon storage, including storage at non-ambient temperatures.

Polysaccharides, such as methyl cellulose and hydroxyethyl cellulose, have dominated the joint compound market almost since the elimination of the use of asbestos. Methyl cellulose ("MC") is a common, nonionic, water-soluble material for such water-based systems. However, MC suffers from several disadvantages not the least of which is its very high cost. In some formulations, MC is responsible for the poor crack resistance obtained. MC is also subject to bacterial and enzymatic-induced degradation ("biodegradation") resulting in loss of viscosity, thus requiring the incorporation of anti-biodegradation preservatives when construction projects are undertaken. In addition, because these types of additives are well known to form lumps in water and are not readily dispersed, the proper addition of MC water retention additives require prehydration in water before addition, resulting in long mixing, and dilution times, and extra production steps. The resulting delays increase processing cost.

For these reasons and others, a search has long continued for a water retention product to replace cellulosics, which is not biodegradable and is without toxic by-products. Also searched for has been a product with a lower overall manufacturing cost and equivalent performance with respect to the water-retention, delayed-drying properties of joint compound compositions and similar compounds into which the additive is used.

Construction Compositions

An important use of water-retention additives is in joint compounds for the construction industry. Starting in the 1940s, the use of wallboard in the United States has largely displaced the use of plaster in interior walls in the construction of buildings. Wallboard is generally installed in panels which are nailed, glued or screwed to the studding of the wall and fitted together until the entire section of wall is covered. The joints where the sections of wall board come together are covered with tape and then the taped joint (and all blemishes, including those caused by nails or other fasteners) are covered with a joint compound (also sometimes called a joint cement) which, upon hardening, can be sanded smooth so that the taped joint cannot be detected when the wall is covered with paint or, in more costly projects, with wallpaper. The process often includes the application of a first coating and a layer of non-adhesive tape which, when dried, is coated by a second joint compound layer. This layer may be sanded and a third layer may be applied and conventionally finished. A variety of joint compounds are used according to the various applications such as dry grade, taping grade, topping grade, all-purpose Grade, ready mix grade and the like. Joint compounds typically are prepared as water-based formulations, the composition of which varies because of geography and climatic conditions.

While joint materials may contain a variety of materials, water retention additives, fillers, binders and thickeners typically must be present. For example, in U.S. Pat. Reissue No. 29,753, cellulosic materials and clay minerals are included in a joint compound formulation wherein the water retention additives discussed include hydroxypropylmethyl cellulose, hydroxyethyl cellulose, alginates and sodium carboxymethyl cellulose. Attapulgite clay is listed as a non-leveling agent.

At first, such joint compounds contained a binder, limestone, mica, and asbestos as their principal ingredients, and were mixed with water, to form a viscous, gel-like, workable substance. Asbestos was included in these compounds for several purposes, with its primary functions being to impart pseudoplasticity and to prevent sag of the compound when applied in a thick layer on a partical surface.

Evidence that certain types of asbestos appear to have carcinogenic characteristics has led to its present ban from almost all of its traditional applications. Both prior to and when the ban became effective, efforts were made to find substitutes in joint compounds for asbestos; many materials were evaluated as asbestos replacements. Today, the overwhelming product of choice in the joint cement industry to replace asbestos is attapulgite clay, although bentonite clay is also frequently used. However, such clays are added as inexpensive fillers, and not to prevent sag in the joint compound or to provide water retention properties.

Attapulgite clay is acicular and has an extremely high surface area in relationship to its weight. Hence, water-soluble cellulosic polymers used as water retention aids in joint cements are attracted to the surface of the clay particles to some degree. The extent or degree of adsorption of the water-soluble polymer on the surface of the attapulgite clay is related to the type of the cellulose and its hydrogen bonding capability, and often results in diminished effectiveness.

Since the elimination of asbestos, methyl cellulose, methylhydroxypropyl cellulose, hydroxyethylcellulose (HEC) and a variety of other modified cellulosics have been used as water retention additives in joint compounds. For example, U.S. Pat. Nos. 4,558,079 and 3,891,582 describe joint compounds using mixtures of these products to impart pseudo-plasticity to the compound described.

Alkali-Swellable Polymers

A number of alkali-swellable polymers have been used in the past as rheological additives or thickeners to provide thickening and viscosity modification to aqueous systems, most commonly paints and coatings.

One of the first such polymers is described in Rheox U.S. Pat. No. 4,226,754, issued in 1980 which, in a preferred embodiment, discloses a polymer made by the reaction of (a) an ester of methacrylic acid, (b) methacrylic acid and (c) a vinyl ester of a saturated aliphatic carboxylic acid. This type of thickener has often been referred to as an alkali-swellable or alkali soluble latex copolymeric thickener, as it contains carboxylic acid groups in sufficient quantity to render the polymer soluble in water following neutralization with a water-soluble base. Rheox, Inc., assignee of the instant invention, sells a product, designated "RHEOLATE 1 ", as a rheological additive which is an embodiment of the invention of U.S. Pat. No. 4,226,754.

U.S. Pat. No. 4,138,381 shows a reaction product of an unsaturated carboxylic acid of 3 to 6 carbon atoms, alkyl acrylate or alkyl methacrylate, and an ester containing an alkyl phenyl group, where the alkyl group has from 8 to 20 carbon atoms. This type of basic carboxyl-containing polymeric chemistry has been extended by the introduction of hydrophobic entities into the polymeric backbone. U.S. Pat. No. 4,384,096 describes an improved water soluble compound which discloses a polymer which is the reaction product of a $C_3$–$C_8$ α,β-ethylenically unsaturated carboxylic acid monomer, a nonionic vinyl monomer, and from 1% to 30% of a defined vinyl surfactant ester. One of the two vinyl surfactant esters shown in the patent is an alkylphenoxypoly-(oxyethylene) ethyl acrylate, wherein the alkyl group is a $C_8$–$C_{16}$ alkyl phenyl group.

A similar variant of a polymeric thickener useful for aqueous paints is described in U.S. Pat. No. 4,421,902. This patent discloses a copolymer which can be the reaction product of monomers including methacrylic acid, ethyl acrylate, optionally a defined copolymerizable ethylenically unsaturated monomer, and a small weight percent of a polyethylenically unsaturated hydrophobic surfactant monomer. This patent further describes how a wide range of such surfactants can provide enhancement of thickening when added to an aqueous system containing the copolymer of the invention, when the emulsion copolymer is neutralized.

Pending U.S. patent application Ser. No. 08/315,000 abandoned commonly assigned to Rheox, Inc., discloses improved high performance alkali—swellable rheological additives for aqueous systems utilizing three reactive monomers one of which can include a specific hydrophobic monomer sold by Rhône-Poulenc of the type discussed herein. U.S. Pat. No. 5,336,318 describes a joint compound from which attapulgite clay can be removed, where a particular type of associative thickener compound is used in combination with traditional cellulosic thickeners including HEC. Associative thickeners used in the examples are described as the commercial products ALCOGUM L-11X and ALCO L-11. The thickener is described as functioning as a thickener and as a pseudoplasticity agent by reacting with the alkaline materials present in the joint compound, which neutralize the acidic groups present in the thickener.

The present invention was developed in response to a search for a replacement for current commercial water retention additives and the long-felt need it represented for a product which will impart the required lubricity and water retention to systems such as joint compounds without the disadvanges of cellulosics.

OBJECT AND SUMMARY OF THE INVENTION

Object of the Invention

It is a specific object of the claimed invention to provide a highly effective water-retention additive for aqueous construction compositions, particularly joint compounds and similar compositions. Such compositions specifically include construction pastes and grouts.

It is a further object of the invention to provide a water retention additive that can be readily dispersed into the system to be modified, which is easily handled, and which can readily be incorporated.

It is a further object of the invention to provide a water retention additive which can easily be made using available chemical materials and current process technology, including known suspension, emulsion and solution polymerization techniques, on a continuous, semi-continuous or individual batch basis.

Other objects, as well as advantages, of the invention will become clear from the following summary and description, or will become apparent to the skilled artisan, as obvious variations of the instant invention.

Summary of the Invention

The water retention additive of the present invention is provided by polymerizing three different types of monomer units described below as monomers a), b) and c), in certain cases, monomer b) can be absent. Both the polymers and their sodium salts are included within the below definitions. Other monomers may also be employed in various amounts, provided they do not adversely affect the novel characteristics and efficiency of the resultant polymer thickener. Specifically, the monomers from which the inventive polymer are prepared comprise the following:

a) about 15–80 weight percent of one or more $C_3$–$C_8$ α, β-ethylenically unsaturated carboxylic acid monomers, such as acrylic or methacrylic acid;

b) about 0–85 weight percent of one or more copolymerizable vinyl nonionic ethylenically unsaturated monomers such as ethyl acrylate, vinyl acetate or methyl methacrylate; and c) about 0.5to 25 weight percent of a nonionic polyethoxylated hydrophobic surfactant monomer.

DESCRIPTION OF THE PREFERRED EMBODIMENTS

The water retention additives of the instant invention are alkali-swellable copolymers made, using presently available reactants, by standard chemical reaction processes, and can be made with available chemical apparatus possessed by most chemical or polymer chemical manufacturers.

Water retention additives are used in joint compounds to provide "open time" and "working life." The joint compound must have enough open time to provide the applicator sufficient opportunity to spread the compound over a large area and to trowel work the compound for at least 15 to 30 minutes before it sets. During this trowel period, the compound must be workable without sticking, lumping, separating or sagging. After application, the joint compound must dry slowly enough (at least an additional 15 to 30 minutes) to prevent cracking. The water retention additive can also provide viscosity, but it is not required to do so. Its principal use is to hold water in the system during application. A Theological additive can be used in combination with the water retention addition to provide thickening and body to the joint compound. While water retention has been provided by methyl cellulosics, thickening in the past has been provided principally by clays, polymers and other rheological additives. The novel polymer of this invention is designed as a replacement or substitute for cellulose; while 100% replacement is possible, the additive can also be used with a reduced amount of cellulose in many aqueous systems.

The novel polymers, sometimes referred to as copolymers, of this invention utilize three reactive starting components: (a) about 15–80 weight percent of one or more $C_3$–$C_8$ α, β-ethylenically unsaturated carboxylic acid monomers, (b) about 0–85 weight percent of one or more copolymerizable nonionic vinyl monomers and (c) about 0.5–25 weight percent of one or more nonionic polyethoxylated hydrophobic surfactant monomers. Within the stated limits, the proportions of the individual monomers can be varied to achieve optimum properties for specific applications. Additional monomers, such as, for example, polyethylenically unsaturated monomers, commonly known as cross-linking agents, can also be added to the reaction, as can macromonomers of the type described in a series of Union Carbide patents, of which U.S. Pat. No. 5,342,883 and patents cited therein are representative.

It is to be understood that other additive chemicals can be mixed with the inventive copolymers, including clays, conventional cellulosics, and other products to prepare mixture compositions useful as water retention additives for aqueous systems.

a) Carboxylic Acid Monomer

The inventive polymer requires about 15–80 weight percent of one or more $C_3$–$C_8$ α, β-ethylenically unsaturated carboxylic acid monomer. Monomers include those with the formula:

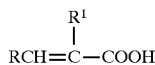

where (a) R is $CH_3$ and $R^1$ is H; (b) R is H and $R^1$ is H, $C_1$–$C_4$ alkyl, or $CH_2$ COOX; or (c) R is COOX and $R^1$ is H or $CH_2COOX$; and X is H or $C_1$–$C_4$ alkyl in (b) and (c).

Acrylic or methacrylic acid or mixtures thereof are most preferred, but fumaric, itaconic, mesaconic, crotonic and ethacrylic acids and other polycarboxylic acids such as maleic acid are also suitable, particularly if used in combination with acrylic or methacrylic acids. It is preferable to have at least about 15 weight percent, and most preferably from about 20–55 weight percent of the carboxylic acid monomer or monomers.

b) Nonionic Vinyl Monomer

In order to give the final co-polymer the polymeric backbone needed for effective thickening in most uses, it is required that about 0–85 weight percent of at least one copolymerizable nonionic vinyl $C_2$–$C_{12}$ α, β-ethylenically unsaturated monomer be utilized in the polymer reaction, which can be selected from the group consisting of the formula:

$CH_2$=CYZ where
Y is H and Z is —$COOR^2$, —$C_6H_4R^3$, CN, Cl,

or —CH=$CH_2$;
Y and Z are Cl; or
Y is $CH_3$ and Z is —$COOR^2$, —$C_6H_4R^3$, CN or —CH=$CH_2$; and $R^2$ is $C_1$–$C_{24}$ alkyl or $C_1$–$C_{24}$ hydroxyalkyl;
$R^3$ is H, Cl, Br, or $C_1$–$C_8$ alkyl; and
$R^4$ is $C_1$–$C_{12}$ alkyl.

Typical examples of such monomers are the $C_1$–$C_8$ alkyl and $C_2$–$C_8$ hydroxyalkyl esters of acrylic and methacrylic acid, ethyl acrylate, ethyl methacrylate, methyl methacrylate, 2-ethylhexyl acrylate, butyl acrylate, butyl methacrylate, 2-hydroxyethyl acrylate, 2-hydroxybutyl methacrylate; the vinyl ester of a saturated aliphatic carboxylic acid such as vinyl acetate, vinyl propionate, vinyl butyrate, or vinyl caprolate; styrene, t-butylstyrene, isopropylstyrene, and p-chlorostyrene; acrylonitrile, methacrylonitril butadiene, isoprene, vinyl chloride, vinylidene chloride, or the like, and mixtures thereof. A monomer such as vinyl acetate, or a mixture thereof with ethyl acrylate and/or methyl methacrylate is preferred. The monomers selected must be copolymerizable with the carboxylic acid monomer. While this monomer can be eliminated completely, it is by far most preferable that it be present in an amount of about 15 to 85% by weight to make the inventive product.

c) Non-ionic Polyethoxylated Hydrophobic Surfactant Monomer

The third monomer component used in an amount of about 0.5–25 weight percent is one or more nonionic polyalkoxylated hydrophobic surfactant monomers. A large variety of such surfactants are useful.

The non-ionic polyethoxylated hydrophobic surfactant monomer, for example, can be of the formula:

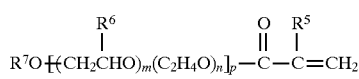

where $R^5$ is H or $CH_3$; $R^6$ is H or $C_1$–$C_2$ alkyl; $R^7$ is a compound defined below; n is an average number from about 6–100 and m is an average number from about 0–50 provided that n≧m and Σ(n+m) is from about 6–100.

Preferred are the acrylate and methacrylate esters selected from the group consisting of 1) poly(ethyleneoxy)ethyl acrylates of the formula:

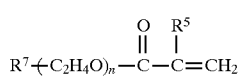

where $R^5$ is H or $CH_3$, $R^7$ is a compound defined below and n is about 6–50; and 2) poly(alkyleneoxy)ethyl acrylates of the formula:

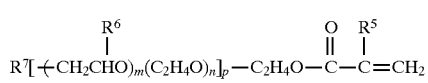

where $R^5$ is H or $CH_3$, $R^6$ is $C_1$–$C_4$ alkyl, $R^7$ is a compound defined below, n is about 6–50 and m is about 1–40 and p=1 to about 10.

The R⁷ compound can be of the formula:

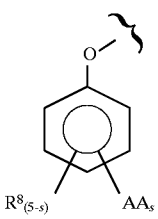

wherein:

R⁸ is a radical bonded to the aromatic ring selected from the group consisting of hydrogen, alkyl, aryl, aralkyl, OR⁶, halo, cyano, COOH, COOR⁹, COONH₂ and OCOR⁹, and where R⁹ is selected from the group consisting of alkyl groups, saturated or unsaturated, having 1 to 22 carbon atoms, aryl and aralkyl.

AA represents an aralkyl group of the type [(—CR¹⁰R¹¹)$_x$Ø] and s is an integer from 1 to 3, R¹⁰ and R¹¹ for each methine carbon of the aralkyl groups are independently selected from the group consisting of H, $C_1$–$C_{12}$ linear or branched alkyl, aralkyl and aryl moieties, x is an integer from 1 to 12, and Ø represents an aryl moiety.

Most preferred is where s is 3; R¹⁰ and R¹¹ are each H; x is 2 and; Ø is phenyl ($C_6H_5$—).

Particularly effective is a vinyl arylphenol hydrophobic monomer manufactured and sold by Rhône-Poulenc Corporation under the name Sipomer SEM-25. Sipomer Sem-25 was formally designated Rhône-Poulenc DV4343. This monomer contains a R⁷ compound of the formula:

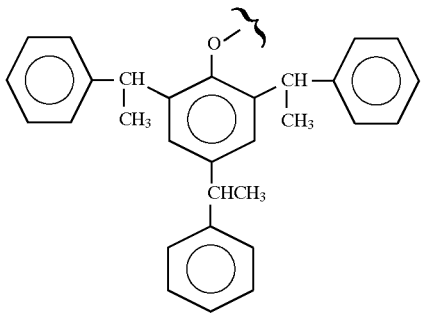

The non-ionic polyethoxylated hydrophobic surfactant monomer can also be of the types described in U.S. Pat. No. 4,384,096 (described therein as monomer C-nonionic vinyl surfactant ester) and the monomer described as monomer 2 in European Patent 0013836, both of which are hereby incorporated by reference. A commercial product, Rohm and Haas product Acrysol TT-935, has proved particularly effective in practicing our invention. Rohm and Haas Acrysol TT-935 is believed to use a surfactant monomer of the type described in the above two patents. Also useful as the surfactant monomer are those surface-active unsaturated esters described in U.S. Pat. No. 4,668,410 as monomer (b).

Another example of a non-ionic polyethoxylated hydrophobic monomer that is effective in the invention is a behenyl polyethoxy ethyl methacrylate designated Sipomer BEM made by Rhône-Poulenc. This monomer is of the formula:

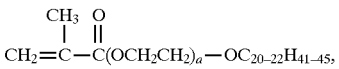

where a averages about 25.

It has been found that the defined monomer c) is important to the performance of the resulting water retention additive. This particular monomer is believed to be copolymerized into the polymer backbone such that the hydrophobic group is pendant to the backbone and separated from it by a large number of water soluble (i.e., hydrophilic monomeric) units. With the addition of this mechanism to the effective alkali—swellable mechanism of a copolymer of a) and b), the polymeric additive of the instant invention displays efficient water retention properties in aqueous construction systems, particularly joint compounds.

Normally about 0.5–25 weight percent of the nonionic surfactant monomer based on total monomer units is utilized, preferably about 0.5–10.0 percent, and most preferably 1.5 to 6.0 percent. Mixtures of such monomers may also be used.

The monomers described above should be reacted as completely as possible during polymerization. It will be understood that, since it is typical to obtain a monomer conversion of ≧99%, the resulting polymer will be a copolymer wherein the monomers employed are incorporated into the copolymer at a weight ratio which is substantially the same as the initial monomer weight ratio employed. Ideally, the monomers will be randomly distributed along the polymer chain.

The inventive polymers may be prepared by polymerizing the monomers by any conventional method known in the art such as by solution, suspension, or emulsion polymerization on a batch, continuous or semi-continuous basis. Emulsion polymerization is by far the preferred system since this route leads to an emulsion of the polymer in water. The polymer can then be used directly in providing water-retention properties to aqueous joint compound compositions.

Typical aqueous emulsion techniques employ an appropriate emulsifying agent for emulsifying the monomers and for maintaining the polymer obtained in an emulsified condition, which is then easy to use.

As an example of a preferred embodiment, emulsion polymerization of the inventive polymer may be conducted as follows:

A reactor, capable of being heated and cooled, and equipped with an agitator, a condenser, and a method of blanketing or sweeping the reaction with an inert gas, is charged with deionized water in an amount of about 50% of the total amount of water desired in the final product. The remaining water and about 90% of the emulsifier to be employed are charged to a separate holding tank equipped with an agitator; the monomers to be used in the polymerization reaction are added to this mixture with agitation and at ambient temperature to form a pre-emulsion.

The reactor and its contents are heated to about 40°14 50° C. under agitation and a suitable emulsion polymerization initiator is added. The temperature is increased to about 70° C. and the remaining (approximately 10%) emulsifier is added, followed by addition of the monomer pre-emulsion over a period of sufficient length that the exotherm of the reaction is controlled, typically a period of several hours. Following completion of addition, heating of the reactor and its contents is continued for a sufficient period of time to ensure complete consumption of the monomers, typically 0.5–2 hours.

Typically, the polymeric solids content of the final reaction mixtures should not exceed about 50% and can conveniently be from about 25 to about 35%. The particular solids content will normally depend on the intended use and the aqueous construction system into which the polymer will be incorporated. The emulsion polymerization initiator used may be one of the free radical yielding initiators, such as the inorganic persulfates, percarbonates, perborates and the like, or organic peroxides and azo compounds, such as benzoyl peroxide, di-t-butyl peroxide or azoisobutyronitrile, which are usually employed in a free radical-type polymerizations. Mixtures of initiators may also be used. The amount of initiator used is normally in the range of from about 0.01 to about 5.0 parts by weight per 100 parts by weight of the total monomeric material to be reacted.

Any suitable emulsifier known by those skilled in the art may be employed to prepare the polymer, including the anionic, cationic and nonionic types. Such emulsifiers can dictate the size and form of the resulting polymers. Exemplary anionic emulsifiers which may be employed include alkali metal and ammonium salts of the sulfates of fatty alcohols having from 8 to 18 carbon atoms, such as sodium lauryl sulfate. Mixtures of emulsifiers may also be employed. Although any effective amount of emulsifier sufficient to emulsify the monomers (in the pre-emulsion) and the resulting polymer may be employed, it is generally preferred that such effective amount constitutes from about 0.1 to about 20 parts by weight per 100 parts by weight of the total monomers to be reacted. As stated above, only about 10% of the total amount of emulsifier to be employed is initially charged to the reactor, with the remainder used to form the pre-emulsion as described above.

The reactor having the water, initiator and emulsifier present therein is typically equipped with any conventional means for agitation. Other ingredients, such as chelating agents, buffering agents, pH adjusting agents and neutralization chemicals, may also be added.

Typically, the rate of monomer or pre-emulsion addition is selected such that it is equal to or slower than the polymerization reaction rate at the temperature employed. This ensures that, by the end of the monomer additions, substantially all of the monomer will have been consumed. At the completion of monomer addition, the reaction temperature is normally increased by about 10 to about 20° C. for a period of from about 30 to about 60 minutes to ensure complete consumption of the monomers.

Alternatively, the polymers of this invention may be prepared by a method in which a mixture of the monomers, free of added water, is added to the reactor containing all the water. Using this procedure, the initiator or initiators, emulsifier or emulsifiers and other chemicals may be added to the monomer mixture, to the reactor before starting addition of the monomers, in a separate feed during the addition of the monomers, or any mixture of methods. It is not necessary that the initiators, emulsifier and other chemicals be added in the same way; i.e., an initiator may be added to the reaction prior to starting addition of the monomers while an emulsifier is added to the monomer mixture.

If desired, conventional chain transfer agents may be used in the polymerization reaction to minimize or prevent undue polymeric chain growth, or to control crosslinking and resultant molecular weight increases, The chain transfer agents are typically first dissolved in the monomers before the monomers are added to the polymerization reactor or emulsified, in the case of the pre-emulsion technique. Suitable chain transfer agents include long chain alkyl mercaptans and carbon tetrachloride. Normally, these agents are used in an amount of from about 0.05 to about 5 parts by weight of chain transfer agent per 100 parts by weight of the total monomers to be reacted.

The polymeric water-retention additives of the present invention, whether used as an aqueous polymer emulsion, solid, or solution, will provide water retention properties to aqueous construction systems and compositions, and most particularly to joint compound compositions upon dissolution of the polymer by neutralization into the aqueous construction composition. The additive can replace cellulosics in joint compound compositions and other systems in whole or in part.

The amount of the polymer that may be dispersed in any given aqueous composition may fall within a wide range depending on the particular system and the water retention qualities desired. Preferably, when the inventive polymeric product resulting from emulsion polymerization is to be added directly to a joint compound or other aqueous formulation, the polymer is present therein in an amount of about 0. 1% to 20% by weight, and most preferably in an amount 0.4% to about 4% by weight, based on the total weight of the formulation.

The mixing of the novel polymeric additive into a composition is particularly easy as the polymer is readily dispersible. In the normal situation, the appropriate amount is mixed into the composition using machine-milling apparatus.

An aqueous composition is herein defined to be a construction composition wherein water comprises from about 5% to nearly 100% by weight of the total composition. The inventive polymers may be used to impart water retention properties to almost 100% water by itself Aqueous construction dispersions, emulsions, suspensions, solutions, slurries and the like may be improved by the subject polymers. The polymers of this invention are used to provide water retention properties to joint compound and similar construction compositions including pastes, construction grouts, stuccos and other water-miscible construction products. Other examples of such compositions include mortars, cements, tile grouts and adhesives.

Joint compounds are well known in the art, and typically comprise an emulsion and a dispersion or suspension of discrete dispersible particles of clay, filler and other chemicals in water. Further optional ingredients often include surfactants, coalescing agents, talc, and the like.

The more usual method of application of the polymers of the present invention is to add the polymer as an emulsion to the medium to be affected and, after mixing, to introduce an alkaline material to neutralize the acid. This method of applying a copolymeric emulsion to an aqueous system enables one to handle a high solids product in a non-viscous state, to obtain a uniform blend, and then to be converted to a highly effective condition by the simple addition of a base material to bring the pH of the system 7 to or above.

The polymers may be utilized in a variety of other ways to provide the compositions of the invention. For example, the polymer, whether in aqueous dispersion or while in a dry form, may be blended into a joint compound system followed by addition of a neutralizing agent. Alternatively, the polymer may first be neutralized in an aqueous dispersion form, and then blended with the system.

The polymer agents may be provided in a dry state. For example, the unneutralized copolymer may be spray dried. It is also possible to spray dry or otherwise dehydrate the neutralized polymer, and then reconstitute the aqueous thickener dispersion at a future time and place by agitation in the aqueous medium, provided the pH of the dispersion is maintained at a proper level.

The polymeric compositions described above are easily made, and easily dispersed,water retention additives, equal to or better than comparable higher-cost and more difficult to handle cellulosics, with a wide spectrum of uses.

The present invention is further illustrated by the following examples. All parts and percentages in the examples as well as in the specification and claims are by weight unless otherwise specified.

EXAMPLE 1

A number of associate alkali—swellable polymers were made by laboratory polymerization using a variety of conventional monomers with some samples, in addition, having as a raw material or component, several parts by weight of Sipomer SEM-25, a polyethoxylated methacrylate monomer containing a tri-styrylphenol hydrophobe monomer obtained from Rhône-Poulenc. The candidate polymers were then tested as water retention additives in the system described hereafter. The aqueous systems containing the polymers were then subjected to a standard shear test and the results are shown below.

A. Monomers used to make polymers were as follows:

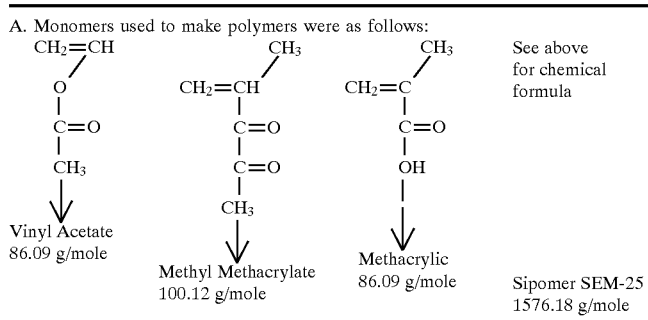

| Vinyl Acetate 86.09 g/mole | Methyl Methacrylate 100.12 g/mole | Methacrylic 86.09 g/mole | Sipomer SEM-25 1576.18 g/mole (See above for chemical formula) |
|---|---|---|---|

B. Polymers were made as follows:

Polymer A

| 40: | 30: | 30: | 0 (by weight) |
|---|---|---|---|
| 36.5%: | 27.3% + 8.7% Aerosol A-102 0.2% Ammonium persulfate | 27.3% | 0 |

Polymer B

| 20: | 40: | 40: | 0 |
|---|---|---|---|
| 19.2%: | 38.5%: + 3.4% Hectorite 0.4% Ammonium persulfate | 38.5%: | 0 |

Polymer C

| 30: | 30: | 40 | 3 |
|---|---|---|---|
| 26.0%: | 26.0%: + 10.4% ABBXEP-110 0.2% Ammonium Persulfate | 34.7% | 3 |

C. The following procedures was used to make the polymers.

Synthesis Procedures - Laboratory

| Polymer A & C Emulsion Polymerization | Polymer B Suspension Polymerization |
|---|---|
| 1) Kettle charged with 150 g $H_2O$ and $N_2$ sparged; | 1) 250 g 1% hectorite slurry $N_2$ sparged |
| 2) Pre-emulsion: 100 g monomers added to 80 g $H_2O$ | 2) Slurry heated to 67° C., stirrer speed = 600 rpm half moon shaped blade, 70 g monomer added, 0.3 g initiator added |
| 3) 10 g pre-emulsion charged to kettle, 0.24 g initiator added (T = 70° C.), react 15 minutes | 3) 100 g $H_2O$ added after 40 minutes, T raised to 80° C. after 75 minutes, after 50 minutes, cool and filter (total time = 2 hours) |
| 4) Pre-emulsion added over 90 minutes, T raised to 80° C. and held 60 min. to 90 min. | 4) Dry and grind thru 0.2 mm screen, |
| 5) Cooled, tiltered through 40 mesh screen-final product = 30% solids | *5) Make up 10% slurry with $H_2O$, neutralize acid with NaOH |
| | *6) Dry in vacuum oven at 60° C., grind thru 0.2 mm screen - final product = powder |
| | * Steps 5) and 6) were used to make the sodium salts in certain cases only. |

D. The following procedures and materials were used to test and make the joint compound formulations.

TEST PROCEDURES

Polymer A, B & C along with controls and other compounds were tested in joint compounds using the sample preparation and testing procedure described below:

OPEN TIME TEST

Materials

Joint filler compound formulation, broadknife, two-feeler gage strips 0.025 inch thick by 12 inches long, gypsum wallboard and Vicat consistency tester were utilized.

Procedure

A 1×12 inch strip of joint compound was applied to a piece of gypsum wallboard with a broadknife between two 0.025 inch feeler gage strips. A Vicat consistency tester with 300 gram plunger and a 10 mm diameter end was used to make indentations in the joint compound at periodic time intervals (e.g., every 2 minutes). The plunger was carefully placed on the joint compound, allowed to remain there for 5 seconds, and removed. The amount of indentation made by the plunger is a measure of the open time of the joint compound. The end point of this test is the time elapsed from the application of the compound to the point where the last indentation is pulled away from the wallboard and the joint compound adheres to the plunger. Additional applications of the plunger were made until no joint compound adhered to the plunger and little or no indentation was observed. These observations help determine how quickly the compound dries, and will distinguish between samples which have an identical initial end point.

JOINT COMPOUND COMPOSITION

The joint compound formulation contained the following materials:

JOINT COMPOUND FORMULATION

| Material | Percent |
|---|---|
| Calcium Carbonate | 59.12 |
| Mica | 3.15 |
| USG P80 F | |
| Attapulgite Clay | 1.58 |
| Milwhite Super Gel B | |
| Poly (vinyl acetate) Latex | 2.68 |
| Union Carbide UCAR 133 | |
| Ethylene Glycol | 0.32 |
| Biocide | 0.09 |
| Troysan 174 | |
| Defoamer | 0.03 |
| Colloids 60 | |
| Water Retention Additive Candidate | 0.39 |
| Water | 32.64 |
| Total | 100.00 |

The joint filler compound formulation was made as follows:

READY MIXED JOINT COMPOUND PREPARATION

A 3000 g batch made in a Hobart Mixer (Model N-50) equipped with a 5 qt. bowl, was prepared in the following manner:

To the Hobart mixer bowl add the following liquids:

| Material | Amount (g) |
|---|---|
| Water | 650.0 |
| Biocide (Troysan 174) | 3.0 |
| Defoamer (Colloids 60) | 1.0 |
| Ethylene glycol | 10.0 |

In a separate container, lightly preblend the following ingredients:

| | |
|---|---|
| Limestone (Georgia Marble #9) | 875.0 |
| Mica (USG P80 F) | 100.0 |
| Attapulgite Clay | 50.0 |
| (Milwhite Super Gel B) | |
| Candidate Additive (Dry Weight) | 12.34 |

Turn mixer on and gradually add the preblended dry ingredients to the mixer. Mix at moderate speed for four minutes scraping the blades and sides of the mixer two times. Add the latex, using the water to rinse the container.

| | |
|---|---|
| Latex (Union Carbide 133) | 85.0 |
| Water | 50.0 |

Mix two minutes, scraping the blades and sides of the bowl two times. Add the remaining ingredients:

| | |
|---|---|
| Limestone (Georgia Marble #9) | 1000.0 |
| Water | 335.0 |
| TOTAL | |

Mix 15 minutes, scraping the blades and sides of the bowl three times, empty the product into a suitable container.

When a liquid, alkali-swellable additive was used, it was added to the liquids at the first step of this procedure, and the pH was adjusted, with sodium hydroxide, to around 9–9.5.

E. RESULTS: (including comparative examples)

Table I presents the Brabender viscosity and open time results for a cellulose standard and polymers A, B and C (and sodium salts thereof) and commercial polyacrylate additives. Certain commercial associative thickener products, designated with the trademarks Acrysol and Alogum products, were also tested. The additives were all put into the joint compound formulation at the same loading, and their subsequent viscosities and open times measured. The Brabender viscosity is an industry standard, similar to the Stormer viscosity used in the coatings industry, that utilizes a Brabender Viscocorder to determine the viscosity in Brabender Units or BU's. The open time was measured using a Vicat Consistency Tester as previously described. The standard, an 80:20 mix of Methocel 240 S:Cellosize QP-100MH, gives a viscosity of 530 BU and an open time of 50 min.

Table 1 details the result of the above testing of the additive candidates. Polymer C and Acrysol TT-935 showed essentially equal water retention properties to the standard. Note, however, that the data in Table I is entirely consistent with the invention hereof, i.e., the alkali-swellable polymers of the invention can provide effective water retention properties, whereas polymers without a nonionic polyalkoxylated hydrophobic surfactant monomer, such as Polymers A and B and the Acrysol ASE and the Alcogum products, provide less water retention.

TABLE 1

Evaluation of various alkali-swellable additives in ready mixed joint compound formulation. Load: 0.39% by dry weight.

| Sample | Overnight Viscosity (BU) 1 min. | 2 min. | Open Time (min.) | pH |
|---|---|---|---|---|
| Joint compound-water | 40 | 60 | 42 | |
| Blank * | | 510 | 10 | |
| Methocel 240S/cellulosic | 540 | 530 | 50 | 9.10 |
| Polymer C | 320 | 300 | 54 | 9.30 |
| Polymer C (second run) | 310 | 280 | 53 | 9.05 |
| Acrysol TT-935 | 160 | 140 | 62 | 8.70 |
| Acrysol TT-935** | 180 | 160 | 62 | 9.55 |
| Polymer A | 360 | 310 | 27 | 9.08 |
| Polymer A** | 220 | 170 | 43 | 9.15 |
| Polymer B | 260 | 240 | 42 | 9.50 |
| Polymer B** | 420 | 400 | 36 | 9.50 |
| Acrysol ASE-60 | 880 | 840 | 9 | 8.90 |
| Acrysol ASE-60** | 670 | 640 | 11 | 9.09 |
| Alcogum L-11 | 980 | 900 | 6 | 9.55 |
| Alcogum L-11** | 780 | 740 | 6 | 9.48 |

* Water was held out so that the joint compound containing no additive would have a viscosity comparable to a typical commercial product.
**Sodium salt.

F. Discussion

The samples labeled "sodium salt" were neutralized with sodium hydroxide and then dried and ground to fine powder; the other samples were added to the joint compound formulations as liquid emulsions and neutralized in situ with sodium hydroxide.

Polymer C and Acrysol TT-935 in particular had excellent water retention properties as reflected by their open times that are similar to the cellulosic standard. All the rest of the inventive examples had acceptable water retention times, comparable to the cellulosic control, and useful viscosity profiles. The competitive comparative Acrysol ASE-60 and Alogum L-1 I products did not have the balance of properties that the inventive products did.

EXAMPLE 2

A number of associate alkali swellable polymers were made by laboratory polymerization of three types:

a) Utilizing the same monomers described in Example 1 with the exception that ethyl acrylate and acrylic acid were used instead of vinyl acetate and methyl methacrylate. The polymer formed utilized 59% ethyl acrylate, 24% acrylic acid, 12% methacrylic acid, and 5% Rhône-Poulenc Sipomer SEM-25. The polymer was designated polymer D, b) Utilizing 47.5% ethyl acrylate, 47.5% methacrylic acid and 5% Rhône-Poulenc Sipomer SEM-25. This polymer was designated Polymer E; and c) Utilizing the same polymers of Polymer C, except that Sipomer BEM was substituted for Sipomer SEM-25. The polymer utilized 30% vinyl acetate, 30% methyl methacrylate, 40% methacrylic acid and 3% Sipomer BEM. This polymer was designated Polymer F.

A control containing Methocel 240S, a hydroxypropyl methyl cellulose manufactured by the Dow Chemical Company and Cellosize QP-100MH, a hydroxyl ethyl cellulose manufactured by The Union Carbide Company was utilized.

Tests run included initial and overnight Brabender viscosities and water retention which was measured indirectly by the dry time of the joint compound when drawn down on gypsum wallboard and exposed to controlled room temperature and humidity drying conditions that were similar to those described in Example 1.

The testing was approached in two different ways; substitution with the experimental sample on a full replacement basis for cellulose and partial substitution replacing only the hydroxylpropyl methyl cellulose portion of the control.

Two data tables showing the results obtained from the full replacement series (Table 2) and the partial replacement series (Table 3) follow. The test formulation and testing methods were similar to Example 1. It should be noted that the drytime tests were all conducted on the same day for both sets of samples. The temperature was 73.4° F. and the relative humidity was recorded at 48%. It should be noted that the amount of water in the formula was held constant by correcting for the amount of water contributed by the rheological additive.

Discussion of Results

When used as a complete substitution for conventional water retention additives, inventive polymers D, E & F all provided acceptable viscosity and water retention open time comparable to the cellulosic water retention additive with Polymer D being particularly comparable as to water retention time. Results showing partial replacement using the product of the invention also showed satisfactory viscosity and open time.

When used as a complete substitution for conventional water retention additives. Polymers D, E & F all provided acceptable viscosity and water retention open time comparable to the cellulosic water retention additive with Polymer D being particularly comparable as to water retention time. Two Union Carbide products also provided effective water retention properties to the joint compound formulation.

Results showing partial replacement using the product of the invention also showed satisfactory viscosity and open time. When the Methocel is removed from the formulation the QP-100MH still provides some level of viscosity but the water retention property is surely reduced. With this addition of the inventive material the formulation achieves proper viscosity and also good water retention properties, see Table 3.

TABLE 2

FULL CELLULOSIC REPLACEMENT SERIES

| | BRABENDER VISCOSITY | | | | | |
|---|---|---|---|---|---|---|
| | Initial | | Overnight | | Drytime Minutes | |
| Sample Description | 1 Min | 2 Min | 1 Min | 2 Min | Trial 1 | Trial 2 |
| Control Methocel 240S + QP-100MH w/UCAR 133 Latex | 580 | 570 | 580 | 560 | 52 | 54 |
| Polymer D | 300 | 285 | 320 | 280 | 59 | 57 |
| Polymer E | 330 | 290 | 420 | 340 | 37 | 35 |
| Polymer F | 460 | 460 | 530 | 530 | 43 | — |

TABLE 3

PARTIAL CELLULOSIC REPLACEMENT SERIES

| | BRABENDER VISCOSITY | | | | |
| --- | --- | --- | --- | --- | --- |
| | Initial | | Overnight | | Drytime |
| Sample Description | 1 Min | 2 Min | 1 Min | 2 Min | Minutes |
| QP-100MH (No Methocel) UCAR 133 Latex | 300 | 280 | 300 | 290 | 71 |
| Polymer D | 435 | 425 | 430 | 420 | 37 |
| Polymer E | 510 | 505 | 490 | 480 | 25 |
| Polymer F | 610 | 610 | 570 | 560 | 37 |

We claim:

1. An aqueous joint compound composition with improved water retention properties having a viscosity of 140 Bradender units or more comprising:
    (a) a aqueous joint compound formulation containing a clay selected from the group consisting of attapulgite clay and bentonite clay, and,
    (b) from 0.1% to about 20% by weight based on the total weight of the aqueous joint compound composition of a polymer produced by a reaction of monomers comprising;
        (i) about 15 to 80 percent by weight of one or more $C_3$–$C_8$ $\alpha,\beta$-ethylenically unsaturated carboxylic acid monomers;
        (ii) about 0 to 85 percent by weight of one or more copolymerizable vinyl non-ionic ethylenically unsatured monomers; and
        (iii) about 0.5 to 25 percent by weight of one or more non-ionic polyethoxylated hydrophobic surfactant monomers.

2. The composition of claim 1, wherein in said polymer, i) is about 15 to 45% by weight, ii) is about 15–85% by weight; and iii) is about 0.5 to 10% by weight.

3. The composition of claim 1, wherein in said polymer, i) is about 20 to 55% percent by weight, ii) is about 20 to 70% percent by weight and iii) is about 0.5 to 3.0 percent by weight.

4. The composition of claim 1, wherein in said polymer, iii) is a poly(ethyleneoxy) ethyl acrylate.

5. The composition of claim 1, wherein said polymer is formed with a macromonomer as an additional reactant.

6. A process of preparing a aqueous joint compound composition having a viscosity of 140 Brabender units or more and providing said composition with improved water retention properties which comprises:
    (a) preparing a aqueous joint compound formulation containing a clay selected from the group consisting of attapulgite clay and bentonite clay,
    (b) mixing into said aqueous joint compound formulation from about 0.1% to about 20% by weight based on the total weight of the aqueous joint compound composition a polymer produced by a reaction of monomers comprising:
        (i) about 15 to 80 percent by weight of one or more $C_3$–$C_8$ $\alpha,\beta$-ethylenically unsaturated carboxylic acid monomers;
        (ii) about 0 to 85 percent by weight of one or more copolymerizable vinyl non-ionic ethylenically unsaturated monomers; and
        (iii) about 0.5 to 25 percent by weight of one or more non-ionic polyethoxylated hydrophobic surfactant monomers.

7. The process of claim 6, wherein in said polymer, iii) is a poly(alkyleneoxy) ethyl acrylate.

8. The process of claim 6, wherein in said polymer, i) is about 15 to 45% by weight, ii) is about 15–85% by weight; and iii) is about 0.5 to 10% by weight.

9. The process of claim 6, wherein in said polymer, i) is about 20 to 55% percent by weight, ii) is about 20 to 70% percent by weight and iii) is about 0.5 to 3.0 percent by weight.

10. The process of claim 6, wherein said polymer is formed with a macromonomer as an additional reactant.

11. The process of claim 6, wherein said polymer is neutralized with sodium hydroxide prior to being mixed into the aqueous composition.

* * * * *